United States Patent
Kropp

(10) Patent No.: US 8,439,578 B2
(45) Date of Patent: May 14, 2013

(54) OPTO-ELECTRONIC ASSEMBLY FOR HIGH SPEED TRANSMISSION

(75) Inventor: Joerg-Reinhardt Kropp, Berlin (DE)

(73) Assignee: VI Systems GmbH, Berlin (DE)

(*) Notice: Subject to any disclaimer, the term of this patent is extended or adjusted under 35 U.S.C. 154(b) by 235 days.

(21) Appl. No.: 12/805,952

(22) Filed: Aug. 26, 2010

(65) Prior Publication Data

US 2012/0121272 A1 May 17, 2012

Related U.S. Application Data

(60) Provisional application No. 61/272,286, filed on Sep. 8, 2009.

(51) Int. Cl.
*G02B 6/12* (2006.01)
*G02B 6/36* (2006.01)

(52) U.S. Cl.
USPC .................. 385/88; 385/14; 385/49; 385/92

(58) Field of Classification Search ............ 385/14, 385/49, 88–94
See application file for complete search history.

(56) References Cited

U.S. PATENT DOCUMENTS

| | | | | |
|---|---|---|---|---|
| 4,732,446 A * | 3/1988 | Gipson et al. | ................... | 385/24 |
| 5,369,529 A * | 11/1994 | Kuo et al. | ................... | 359/858 |
| 5,627,931 A * | 5/1997 | Ackley et al. | ................... | 385/88 |
| 6,364,542 B1 * | 4/2002 | Deane et al. | ................... | 385/92 |
| 6,488,417 B2 * | 12/2002 | Kropp | ................... | 385/88 |
| 6,491,447 B2 * | 12/2002 | Aihara | ................... | 385/92 |
| 6,711,186 B2 * | 3/2004 | Komeda | ................... | 372/29.02 |
| 6,901,185 B2 * | 5/2005 | Sasaki et al. | ................... | 385/33 |
| 7,399,125 B1 * | 7/2008 | Whaley et al. | ................... | 385/92 |

\* cited by examiner

*Primary Examiner* — Daniel Petkovsek

(57) ABSTRACT

The optoelectronic assembly for high speed signal transmission based on surface-emitting/receiving components is disclosed. The assembly contains a mounting plate with a top side used for the mounting of the components; single or multiple electrooptical or optoelectronic transducer components with the optical ports of the transducer on the top side and a bottom side used for assembly; a micro-mirror component; an optical transmission path wherein the transmission axis is oriented substantially parallel to the surface of the transducer components and to the top side of the mounting plate; and a transducer component mounted with the bottom side on the mounting plate near a micro-mirror component mounted above the transducer component in such a configuration that the optical transmission path to or from the transducer is reflected at the mirror surface such that the transducer is optically coupled to this same transmission path.

10 Claims, 8 Drawing Sheets

Assembly with transducer and micro-mirror on a mounting plate

Figure 1: Prior art of a transmitter assembly with edge emitting transmitter
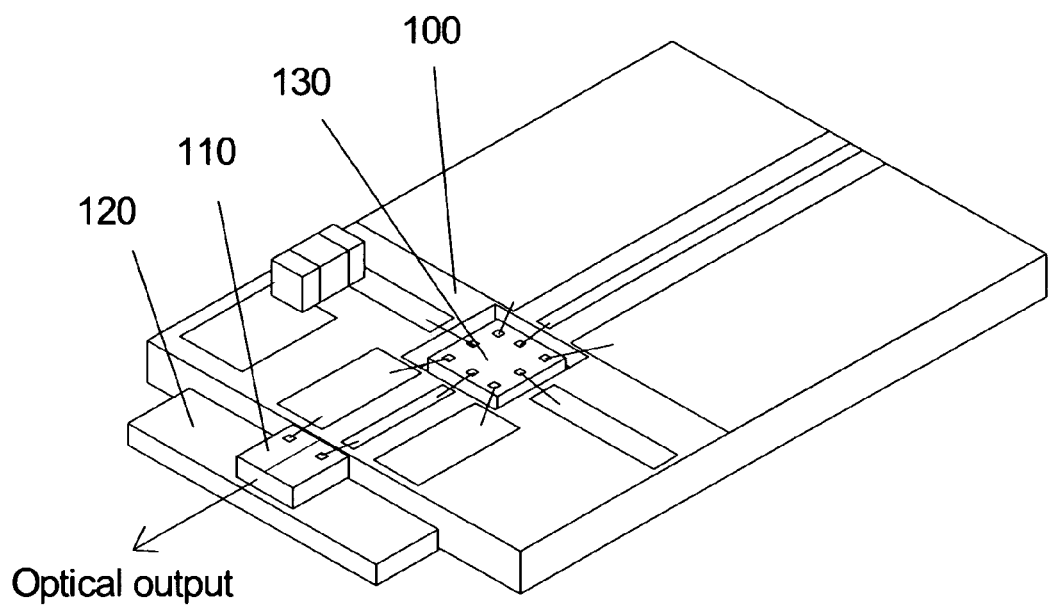

Figure 2: Assembly with transducer and micro-mirror on a mounting plate
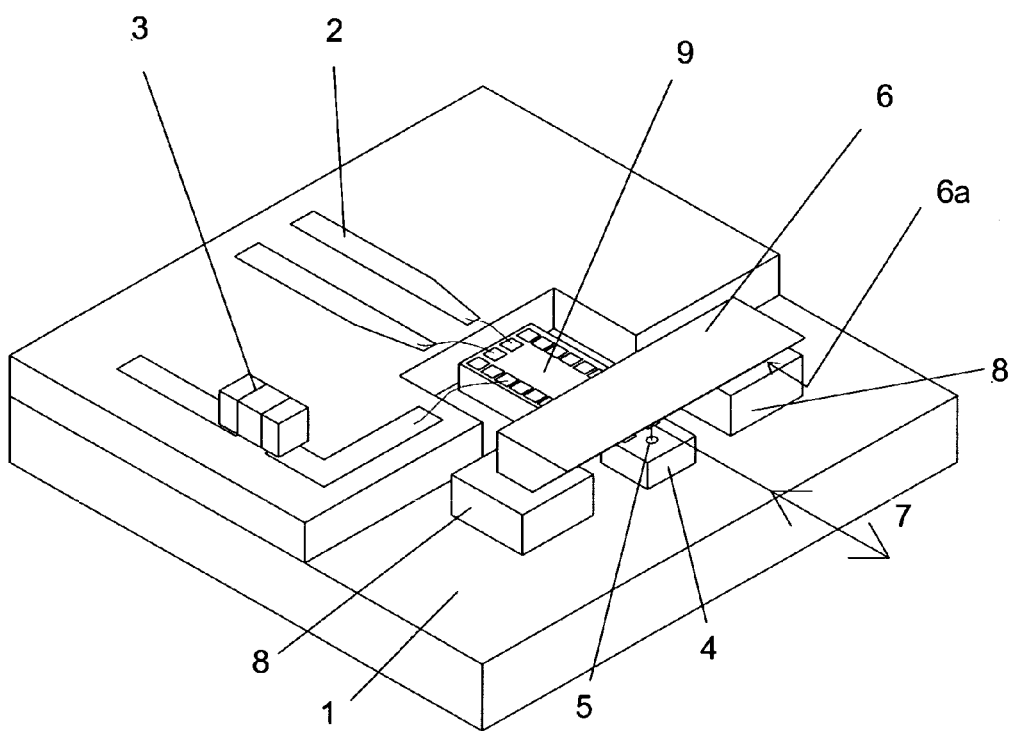

Figure 3: Assembly with standoff parts with a angled mounting surface
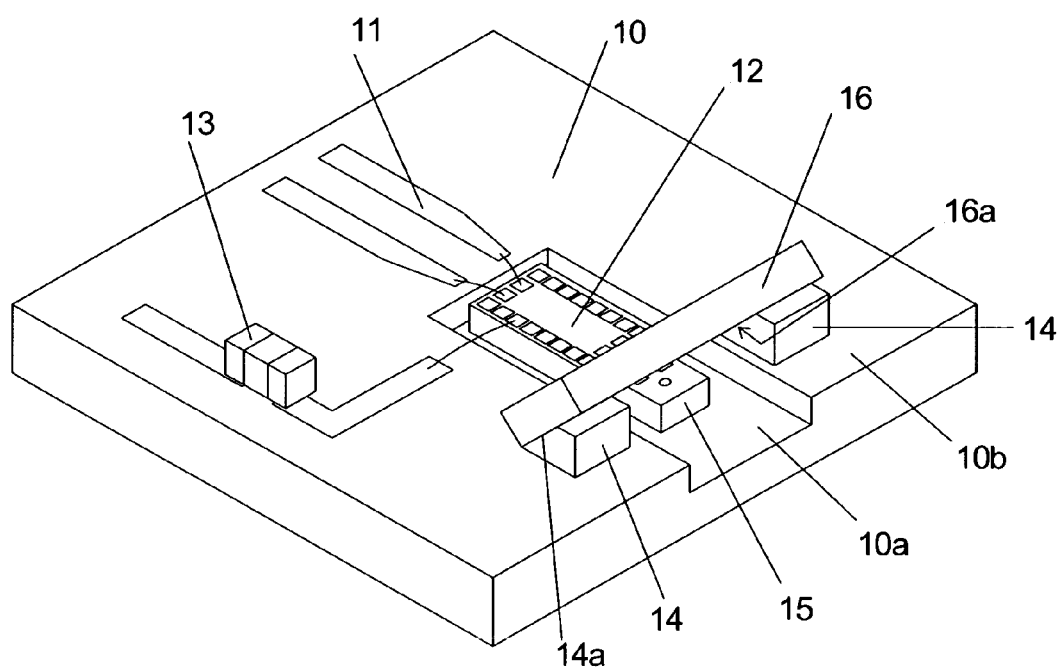

Figure 4: Assembly of a micro-mirror on a mounting plate with 3d structured top surface
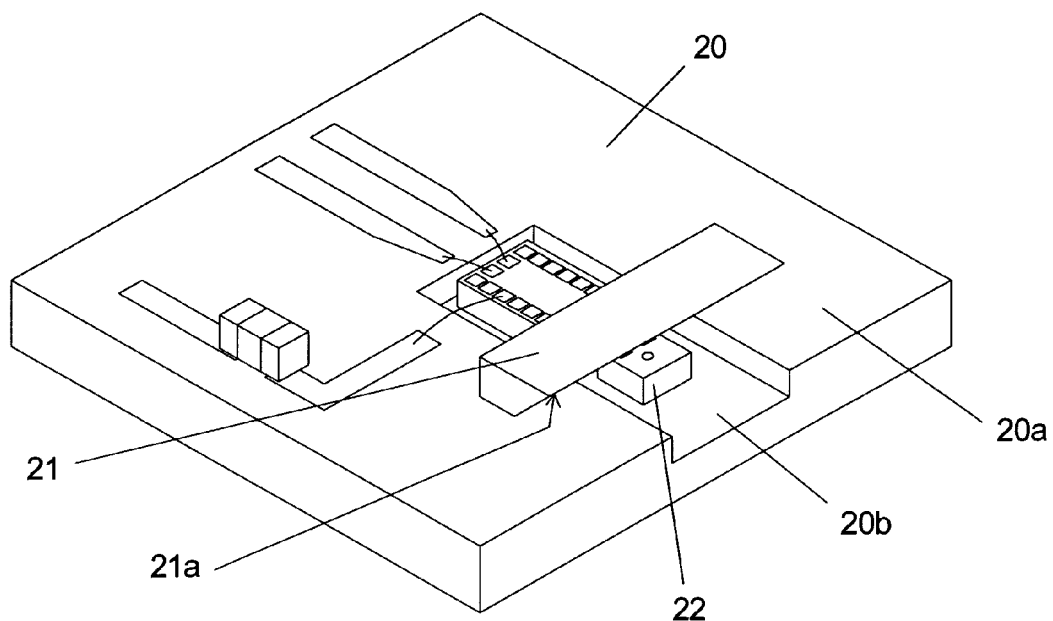

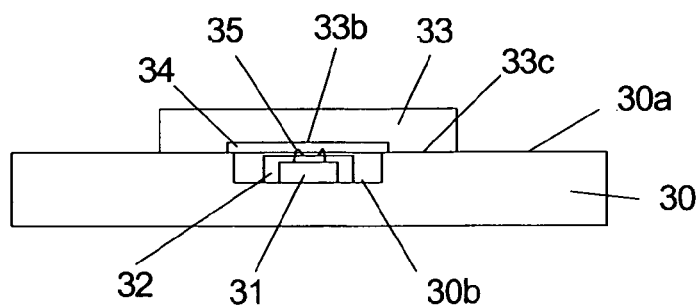
Figure 5: Front view of embodiment with a micro-mirror having a structured bottom side Figure 6: Bottom View of micro-mirror having a structured bottom side
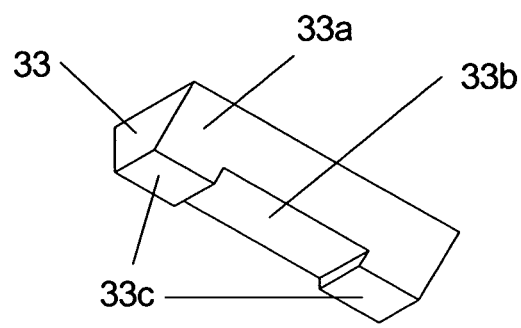

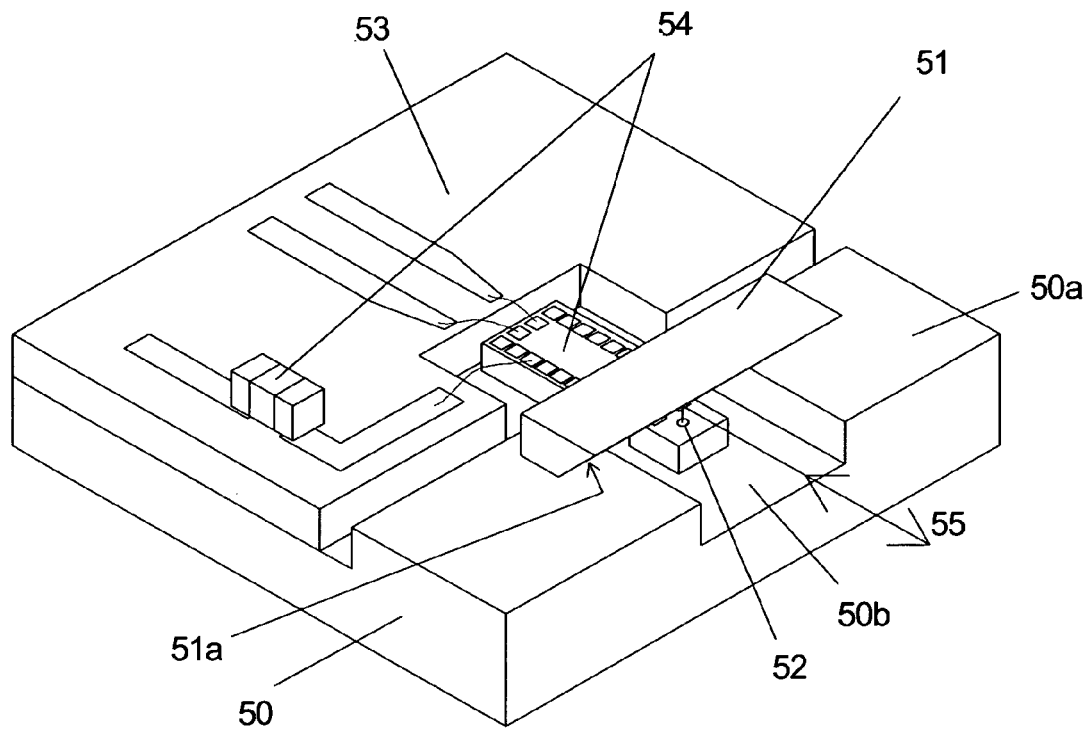
Figure 7: Assembly with mounting plate with areas of different height on the top surface Figure 8: Assembly with micro-mirror mounted on standoff parts
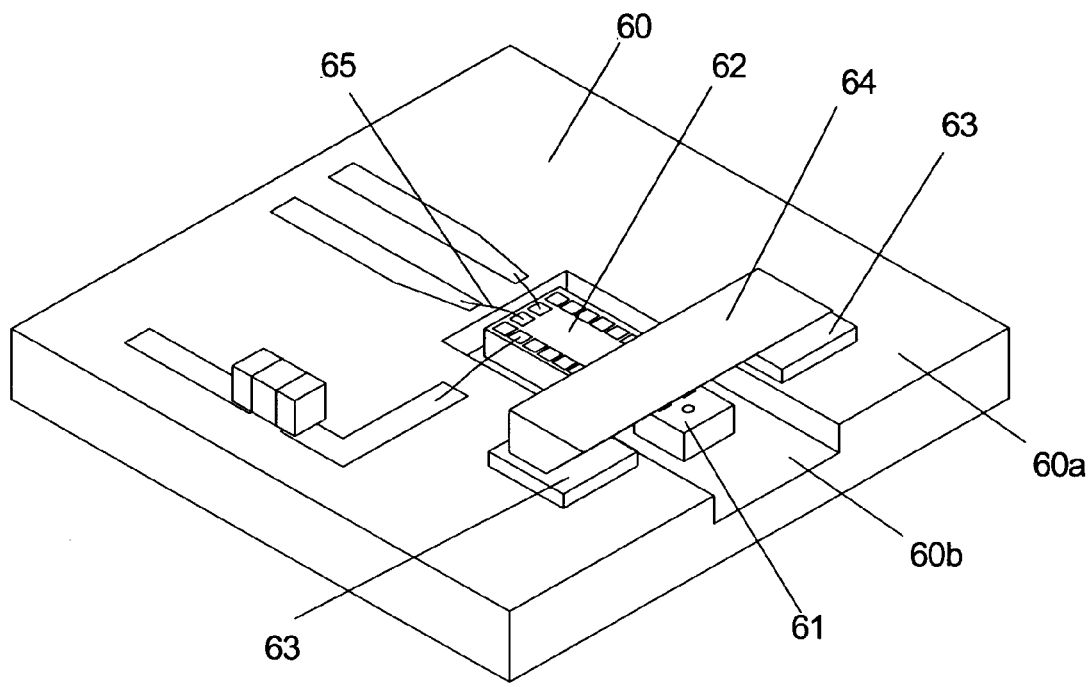

OPTO-ELECTRONIC ASSEMBLY FOR HIGH SPEED TRANSMISSION

REFERENCE TO RELATED APPLICATIONS

This application claims an invention which was disclosed in Provisional Application No. 61/272,286, filed Sep. 8, 2009, entitled "Opto-Electronic Assembly for High-Speed Transmission". The benefit under 35 USC §119(e) of the United States provisional application is hereby claimed, and the aforementioned application is hereby incorporated herein by reference.

BACKGROUND OF THE INVENTION

1. Field of the Invention

The present invention relates to optoelectronic apparatus, for example to signal interconnections between the electronics and the optical transmission medium and vice versa.

Advanced systems for long distance and short distance communication need very high speed interconnects for the inter system as well as intra system information transmission. The standard technology for this purpose is optical transmission over fibers. The key components for the aforementioned technology include the electro-optic (e-o) transducer acting as a transmitter, and the opto-electronic (o-e) transducer acting as a receiver. Such transducers are used in every optical communication system.

For the very high transmission speeds of 10 Gbit/sec and above it is necessary to apply high speed optical and electronic components as well as special solutions for the packaging of such a transducer module in order to reach the required overall high-frequency (HF) performance.

A transmitter or receiver module in general consists of the module housing with an electronic interface and an optical interface and the opto-electronic assembly inside the housing. The opto-electronic assembly consists of an arrangement of: 1) optical components such as laser diode and photodiode chips; 2) active electronic components such as patterned circuit boards and mounted integrated circuits; and 3) other mechanical or passive optical components, wherein all components are inside the housing.

To achieve good HF-performance with such an opto-electronic assembly it is necessary to use a circuit board with impedance matched electrical transmission lines as well as an assembly and interconnection technology that is optimized for the high speed signal transmission. Furthermore, the opto-electronic assembly has to comply with the type and performance specifications of the applied optical and electronic components.

Such opto-electronic assemblies are used inside packages that include an optical and an electronic interface (or port). The optical interface of such a package is attached to an optical connector or optical fiber port and forms what is called a subassembly. The subassemblies with an optical connector for departing or entering optical data signals are called transmitter optical subassemblies (TOSAs) and receiver optical subassemblies (ROSAs), respectively. Such subassemblies are used as a building block in higher complexity integrated modules such as various types of transceivers or transponders that include a TOSA and a ROSA and also various kinds of electronic functions via an electronic port. For these types of applications there is limited physical space and it is necessary that the package is designed in a geometry wherein the optical port and the electronic port are located on opposite sides of the package.

2. Description of Prior Art

The prior art opto-electronic transducer modules for high speeds like 40 Gbit/sec use as the optical transducer edge-emitting or edge-receiving semiconductor chip devices (see FIG. 1). These devices are assembled in a planar arrangement in order to achieve the desired HF-performance. The devices are arranged parallel to the surface of the circuit board (100). The laser diode (110) is assembled on a submount (120) in order to reach a similar height as the top surface of the circuit board (100), and the main optical axis of the optical radiation is also parallel to the surface of the circuit board.

In a further arrangement the edge-emitting laser or edge-sensitive photodiode (PD) is mounted upside down using the "Flip-Chip" assembly method directly on the top surface of the circuit board. This results in superior HF-performance because the electrical connections are very short.

SUMMARY OF THE INVENTION

The present invention discloses an assembly and arrangement for such a high speed package which uses optical transducer chips having the emitting or receiving function perpendicular to the chip surface. Well-known optical transducers of this kind include photodiodes (PD) and vertical cavity surface emitting lasers (VCSELs).

In accordance with the characteristics of the present invention, the opto-electronic assembly for high speed opto-electronic signal transmission comprises:
- a mounting plate with a top side used for the mounting of components;
- an electro-optical or opto-electronic transducer component with the optical port of the transducer on the top side and a bottom side used for assembly;
- a micro-mirror component;
- an optical transmission path wherein the transmission axis is oriented substantially parallel to the surface of the transducer component and to the top side of the mounting plate; and
- a transducer component that is mounted with the bottom side on the mounting plate near a micro-mirror component that is mounted above the transducer component in such a configuration that the optical transmission path to or from the transducer is reflected at the mirror surface such that the transducer is optically coupled to this same transmission path.

The various embodiments of the present invention include modifications of designs for the mounting plate and the micro-mirror, and include the use of various standoff components. The compact assembly will show superior HF-characteristics. Moreover, a single design type of assembly may be used for both transmitter and receiver subassemblies.

BRIEF DESCRIPTION OF THE DRAWINGS

FIG. 1 is presenting the prior art of a transmitter assembly with an edge emitting laser.

FIG. 2 is showing an assembly with transducer and micro-mirror on a mounting plate.

FIG. 3 is showing an assembly with standoff parts which have an angled mounting surface.

FIG. 4 is showing an assembly of a micro-mirror on a mounting plate with 3d structured top surface FIG. 5 is a front view of an embodiment with a micro-mirror having a structured bottom side FIG. 6 is a bottom view of a micro-mirror having a structured bottom side FIG. 7 is showing an assembly with mounting plate with areas of different height on the top surface FIG. 8 is showing an assembly with micro-mirror mounted on standoff parts

DETAILED DESCRIPTION OF THE EXEMPLARY EMBODIMENTS

FIG. 1 shows the prior art of an assembly for high speed transmission with an edge emitting laser diode as an optical transmitter. Some electronics is mounted on the circuit board (100) that may consist of a bias tee circuit or that can include a driver IC-chip (130). Very often the IC (130) is mounted on a lower platform of the circuit board such that the surface of the IC is at about the same height as the top substrate surface. In this arrangement it is possible to apply very short electrical connections between the electrical contacts on the circuit board and the IC. This is necessary to get the good HF-performance of the assembly. Close to one edge of the circuit board an edge emitting laser (110) is mounted on a submount (120). Again the laser is mounted on such a height level that the top surface of the laser is at about the same height level as the surface of the circuit board in order to reach a very short distance for the electrical connection.

In this configuration the laser radiation is transmitted parallel to the surface of the substrate. That is desired for the application because it is possible to form a flat TOSA with the optical interface at one sideface.

Referring now to FIG. 2, the construction of an assembly for high speed transmission in accordance with the present invention is shown. A transducer (4) with the optical port (5) on the top surface is mounted on the top surface of a mounting plate (1). Neighbouring to the transducer are mounted the standoff parts (8) on the mounting plate (1). The micro-mirror component (6) is attached on the standoff parts (8) that it is located above the transducer component (4) in a configuration that the optical transmission path (7) is reflected at the mirror surface such that the optical port (5) is optically coupled to the transmission path (7). The optical port (5) is oriented vertically. Due to the reflection at the micro-mirror component (6) the transducer is connected to the optical transmission path with the transmission axis (7) oriented substantially parallel to the surface of the transducer component and the top side of the mounting plate (1). In this configuration the orientation of the micro-mirror (6) is in such a position that the mirror surface (6a) is oriented in the direction of the optical port (5) in order to perform the connection of the transducer (4) to the horizontal optical path (7). The micro-mirror component (6) is designed as a block with one side-face (6a) arranged at an angle of about 45° to the top or bottom surface of the block. The side face (6a) has a surface quality and coating which is suitable to achieve a high reflection of the relevant optical radiation.

On the mounting plate (1) further is assembled an integrated circuit chip (9) close to the transducer (4) as well as a circuit board (2) which has attached an electronic component (3).

FIG. 3 shows another embodiment of the present invention, an assembly with a mounting plate (10) that is designed as a substrate with electrical conducting traces (11) on the top surface on which are mounted electronic components (12) and (13) and mechanical elements (standoffs (14)) in addition to the transducer (15). The stand-off elements (14) are designed with at least one side-face (14a) which has an angle of about 45° and that the micro-mirror component (16) is attached to that side-face (14a) in such a position that the mirror surface 16a) is oriented in the overall direction to the transducer. Further the mounting plate (10) has on the top surface areas of different heights with the transducer mounted on an area with lower height (10a) and the micro-mirror mounted on a higher area (10b) such that the mirror area is positioned above the transducer with an angle of about 45° towards the transducer (15). In this embodiment the micro-mirror (16) is formed as a simple rectangular block with the mirror on one surface (16a).

FIG. 4 shows again a mounting plate (20) that is designed as a substrate with conducting traces that has on the top surface areas of different heights with the transducer mounted on an area with lower height (20b) and the micro-mirror component (21) mounted on a higher area (20a) such that the mirror area (21a) is positioned above the transducer (22) with an angle of about 45° towards the transducer (22). The height difference between the surfaces (20a) and (20b) is larger than the height of the transducer component (22). Therefore this opto-electronic assembly does not need any additional standoff components.

FIG. 5 shows the front view of an assembly of a mounting plate (30) that has on the top surface areas of different heights compared to the transducer (31) and the electronic chip (32) mounted on an area with lower height (30b) and the micro-mirror component (33) mounted on a higher area (30a). Further the micro-mirror component (33) is mounted in some distance to the upper surface of the transducer (31) such that there is a gap (34) between the lower surface of the micro-mirror and the upper surface of the transducer. Further the gap provides enough space for the wire bond connections (35). This embodiment applies a micro-mirror component which is designed with a bottom side with some portions (33b) standing back from other areas of the bottom side (33c) such that in the assembled configuration there exist a gap area between the bottom side of the micro-mirror and the upper side of the transducer. The bottom view on such a single micro-mirror component (33) is shown separately in FIG. 6. The surface (33a) is the reflecting mirror surface. (33b) and (33c) are the bottom side of the mirror with the area (33b) standing back from the areas (33c).

FIG. 7 shows an assembly with the mounting plate (50) which has on the top surface areas of different heights with the transducer mounted on an area with lower height (50b) and the micro-mirror mounted on a higher area (50a) such that the mirror surface area (51a) is positioned above the transducer (52) with an angle of about 45° towards the transducer (52). The transducer (52), the mirror component (51) as well as a substrate with conducting traces (53) and electronic components (54) are assembled directly on the mounting plate. The height difference between the surfaces (50a) and (50b) is larger than the height of the transducer component (52). Therefore there exist a gap area between the bottom side of the micro-mirror (51) and the upper side of the transducer (52) and the opto-electronic assembly does not need any additional standoff components.

FIG. 8 shows an assembly with a mounting plate (60) that is designed as a substrate with electrical conducting traces on the top surface. Further it has on the top surface areas of different heights (60a and 60b). The transducer component (61) and an electronic chip (62) are mounted on the lower surface area (60b) of the mounting plate (60).The height difference between the areas 60a and 60b is similar to the height of the transducer (61) and the electronic chip (62). In that configuration the chip surfaces and the top surface (60a) of the mounting plate have about the same height which is very helpful to apply very short wirebond connections (65) between the mounting plate and the chips. These short wirebond connections are necessary to achieve an optimal HFresponse of the assembly. On the top surface of the mounting plate (60*a*) are assembled two standoff parts (63) with the micro-mirror component (64) mounted on top of the standoffs (63). The standoffs (63) generate a gap area between the bottom side of the micro-mirror (64) and the upper side of the transducer (61). In that gap area there are located also the wire bond connections from the transducer (61) to the electronic chip (62) (see also FIG. 5, (35)).

All embodiments of the present invention have the following advantages:

i) The electrical connections between the transducer and the integrated circuit as well as between the integrated circuit and the substrate which are critical for a good HF-performance are very short. Therefore it is possible to reach very high transmission rates above 10 Gbit/sec.

ii) The small micro-mirror is assembled very close above the vertical oriented transducer. The result is a very small and compact assembly with a redirection of the optical path. With such an assembly it is possible to reach the common configuration of the optical path on one side and the electrical connection on the opposite side of the subassembly in a very small and compact configuration and with vertical oriented transducers.

iii) All the applied components are very small and can be manufactured in a chip-like design. Further the assembly is planar from the top down to the mounting plate. Therefore it is possible to assemble such a configuration with standard high accuracy semiconductor equipment. Such micro-mirror with a mirror surface at some angle can be manufactured with planar etching technology of silicon wafers. You can get several thousand micro-mirrors from one wafer and can pick the mirror from tape for the assembly. The standoff chips can be diced in the appropriate dimensions from wafers of the desired thickness and can be assembled with standard pick-and-place equipment.

iv) When functioning as transducers, both the high speed PIN-photodiode receivers (with very small diameters of about 10 to 20 μm) and the VCSEL emitters have the same vertical orientation and about the same chip size. Therefore it is possible to use the same basic assembly concept and size for both, transmitter and receiver. That gives an advantage for the further packaging steps because you can apply the same package design for a transmitter assembly and a receiver assembly.

The orientation of the mirror is not necessarily 45° in all cases. It may be arranged with some other angle to reach certain optical coupling conditions. An example of such a special configuration is the mirror orientation of (45 +2 or −2)°. With that angle it is reached about 4° deviation from the horizontal orientation after the reflection. That direction of the beam axis can be used to reach optimized optical coupling conditions into an angled fiber with an 8° end-face. Furthermore other angles can be applied for example to avoid back reflections from the transducer to the optical transmission path.

What is claimed is:

1. An opto-electronic assembly for high speed opto-electronic signal transmission comprising:
   a) a mounting plate with a top side, wherein said top side further comprises at least one area at a higher level and at least one area at a lower level, wherein said mounting plate further comprises electrical conducting lines located on said at least one area at said higher level, wherein said conducting lines are designed for high frequency transmission at ten Gigabytes per second and above;
   b) at least one first electro-optical or opto-electronic transducer component having an optical port of the transducer and electrical contact pads on the top side of said transducer, wherein a bottom side of said transducer is used for the assembly;
   c) an integrated electronic circuit chip having a number of electrical contact pads on the top side of said mounting plate, wherein said number is at least two;
   d) a micro-mirror component;
   e) an optical transmission path wherein the transmission axis is oriented substantially parallel to the surface of the transducer component and to the top side of the mounting plate;
   wherein said transducer and said integrated electronic circuit chip are mounted on said at least one area at said lower level of said mounting plate in such a way that
      i) said micro-mirror component is located above said transducer with the reflecting mirror surface oriented at an angle close to forty-five degrees towards said transducer, and
      ii) a gap is formed between the top surface of said transducer and the bottom surface of said micro-mirror component; and
   f) electrical connections directly connecting the pads of said transducer with selected a first group of contact pads of said a number of contact pads of said integrated electronic circuit chip, and
   g) electrical connections directly connecting contact pads of a second group of contact pads distinct from said first group of contact pads of said a number of contact pads of said integrated electronic circuit chip to said electric conducting lines on said at least one area at said higher level of said mounting plate.

2. The opto-electronic assembly of claim 1, wherein there is mounted at least one stand-off element on the top side of the mounting plate and that micro-mirror component is mounted on top of the stand-off element.

3. The opto-electronic assembly of claim 1, wherein the micro-mirror component is designed as a block with one side-face arranged at an angle of about 45° to the top or bottom surface and that that side-face has a surface quality and coating which is capable to achieve a high reflection of the relevant optical radiation.

4. The opto-electronic assembly of claim 2, wherein said at least one stand-off element has a shape of a plan-parallel plate with one of the plan-parallel surfaces mounted on the mounting plate and the opposite surface used as the basis to mount the micro-mirror component in such a position that the mirror surface is oriented at an angle of about forty-five degrees to the surface of the transducers.

5. The opto-electronic assembly of claim 2, wherein said stand-off element is designed with at least one side-face which has an angle of about forty-five degrees and that the micro-mirror component is attached to that side-face in such a position that the mirror surface is oriented at an angle of about forty-five degrees to the surface of the transducer.

6. The opto-electronic assembly of claims 1, wherein the gap area between the upper surface of the transducer and the lower surface of the micro-mirror component is at least partially filled with a globe top for the encapsulation of the transducer.

7. The opto-electronic assembly of claim 1, wherein the micro-mirror component is designed with a bottom side with some portions standing back from other areas of the bottom side such that in the assembled configuration there exist a gap area between the bottom side of the micro-mirror component and the upper side of the transducer.

8. The opto-electronic assembly of claim 1, wherein the transducer is formed by a photodiode and the integrated electronic circuit is an amplifier that is electrically connected to the photodiode and with the micro-mirror component mounted above the photodiode such that there is a free gap between the top surface of the photodiode, the electrical connection from the photodiode to the amplifier and the top surface of the amplifier on one hand and the bottom surface of the micro-mirror component on the other hand.

9. The opto-electronic assembly of claim 1, wherein the transducer is formed by a top emitting optical transmitter and the integrated electronic circuit is an electronic driver that is electrically connected to the optical transmitter and with the micro-mirror component mounted above the optical transmitter such that there is a free gap between the top surface of the optical transmitter, the electrical connection from the optical transmitter to the driver and the top surface of the driver on one hand and the bottom surface of the micro-mirror component on the other hand.

10. The opto-electronic assembly for high speed opto-electronic signal transmission of claim 1 further comprising
  h) at least one second -electro-optical or opto-electronic transducer component distinct from said at least one first electro-optical or opto-electronic transducer component,
  wherein said at least one second electro-optical or opto-electronic transducer component has an optical port of the transducer and electrical contact pads on the top side of said transducer,
  such that said optoelectronic assembly comprises multiple electro-optical or opto-electronic transducer components.

* * * * *